(12) United States Patent
Corcelles Pereira et al.

(10) Patent No.: US 7,652,387 B2
(45) Date of Patent: *Jan. 26, 2010

(54) STATOR CONTROLLED INDUCTION GENERATORS WITH SHORT-CIRCUITED ROTOR

(75) Inventors: Jose Manuel Corcelles Pereira, Madrid (ES); Jose Luis Rodriguez-Amenedo, Madrid (ES); Santiago Arnaltes-Gómez, Madrid (ES)

(73) Assignee: Wind To Power Systems, S.L., Madrid (ES)

( * ) Notice: Subject to any disclaimer, the term of this patent is extended or adjusted under 35 U.S.C. 154(b) by 165 days.

This patent is subject to a terminal disclaimer.

(21) Appl. No.: 11/716,438

(22) Filed: Mar. 9, 2007

(65) Prior Publication Data

US 2008/0157530 A1 Jul. 3, 2008

(30) Foreign Application Priority Data

Dec. 28, 2006 (WO) ................ PCT/ES2006/000721

(51) Int. Cl.
*H02P 9/04* (2006.01)
*F03D 9/00* (2006.01)
*H02P 23/00* (2006.01)
*H02P 25/00* (2006.01)
*H02P 27/00* (2006.01)
*H01F 17/00* (2006.01)

(52) U.S. Cl. .................... 290/44; 318/760; 323/363
(58) Field of Classification Search ............... 290/44; 318/760; 323/363
See application file for complete search history.

(56) References Cited

U.S. PATENT DOCUMENTS

| 2,292,171 | A | * | 8/1942 | Stohr | 318/766 |
| 2,585,392 | A | * | 2/1952 | Letrilliart et al. | 322/39 |
| 2,859,005 | A | * | 11/1958 | Owen et al. | 244/194 |
| 2,916,632 | A | * | 12/1959 | Petterson | 250/559.36 |
| 3,048,771 | A | * | 8/1962 | Jordan | 323/363 |
| 3,211,981 | A | * | 10/1965 | Jordan | 318/760 |
| 3,469,134 | A | * | 9/1969 | Bering et al. | 310/164 |
| 3,591,844 | A | * | 7/1971 | Schonebeck et al. | 290/31 |
| 4,341,989 | A | * | 7/1982 | Sandberg et al. | 322/95 |
| 4,761,602 | A | * | 8/1988 | Leibovich | 318/816 |
| 5,083,039 | A | | 1/1992 | Richardson et al. | 290/44 |
| 5,793,136 | A | * | 8/1998 | Redzic | 310/114 |
| 6,737,757 | B1 | * | 5/2004 | Stiesdal | 290/44 |
| 6,867,522 | B1 | * | 3/2005 | Vlemmings et al. | 310/125 |
| 7,164,562 | B2 | * | 1/2007 | Virtanen | 361/20 |
| 7,239,036 | B2 | * | 7/2007 | D'Atre et al. | 290/44 |
| 7,321,221 | B2 | * | 1/2008 | Bucker et al. | 322/44 |

(Continued)

FOREIGN PATENT DOCUMENTS

DE 10105982 A1 10/2002

(Continued)

*Primary Examiner*—Nicholas Ponomarenko
*Assistant Examiner*—Pedro J Cuevas
(74) *Attorney, Agent, or Firm*—Patton Boggs LLP

(57) ABSTRACT

A generator is connectable to a turbine for generating electric power or a motor. An electric power generator system or a motor comprises an asynchronous short-circuited rotor generator or motor comprising a stator, a rotor, and a transformer having a first winding and a second winding, the first winding having a first end and a second end. The stator and the transformer are connectable in series with an electric power distribution grid.

16 Claims, 7 Drawing Sheets

U.S. PATENT DOCUMENTS

| | | | |
|---|---|---|---|
| 7,332,827 B2 * | 2/2008 | Nielsen | 290/55 |
| 7,365,451 B2 * | 4/2008 | Aritsuka | 307/17 |
| 7,423,406 B2 * | 9/2008 | Geniusz | 318/800 |
| 7,471,007 B2 * | 12/2008 | Bucker et al. | 290/44 |
| 7,518,256 B2 * | 4/2009 | Juanarena Saragueta et al. | 290/44 |
| 7,525,824 B2 * | 4/2009 | Veenstra | 363/37 |
| 2003/0202367 A1 * | 10/2003 | Schreiber | 363/72 |
| 2005/0237678 A1 * | 10/2005 | Virtanen | 361/18 |
| 2006/0131960 A1 * | 6/2006 | Aritsuka | 307/17 |
| 2006/0163881 A1 * | 7/2006 | Bucker et al. | 290/44 |
| 2006/0192390 A1 * | 8/2006 | Juanarena Saragueta et al. | 290/44 |
| 2006/0214428 A1 | 9/2006 | Altemark et al. | 290/44 |
| 2006/0238929 A1 * | 10/2006 | Nielsen | 361/20 |
| 2007/0024059 A1 * | 2/2007 | D'Atre et al. | 290/44 |
| 2007/0052394 A1 * | 3/2007 | Geniusz | 323/205 |
| 2007/0278797 A1 * | 12/2007 | Flannery et al. | 290/44 |
| 2008/0093854 A1 * | 4/2008 | Bucker et al. | 290/44 |
| 2008/0150285 A1 * | 6/2008 | Corcelles Pereira et al. | 290/44 |

FOREIGN PATENT DOCUMENTS

| | | |
|---|---|---|
| ES | 2163357 | 1/2002 |
| ES | 2245608 | 1/2006 |
| GB | 2423650 A | 8/2006 |
| WO | WO-2006/003224 A1 | 1/2006 |

* cited by examiner

STATOR CONTROLLED INDUCTION GENERATORS WITH SHORT-CIRCUITED ROTOR

CROSS-REFERENCE TO RELATED APPLICATIONS

This application claims priority to the application filed in Spain under PCT Application No. PCT/ES2006/000721 on Dec. 28, 2006.

FIELD OF THE INVENTION

The present invention refers, in general, to an asynchronous short-circuited rotor generator, or induction generator, connectable to a turbine, such as a wind turbine, to generate electric power that is delivered to an electric power distribution grid. The system also applies to a motor.

BACKGROUND OF THE INVENTION

It is known in the state of the art that currently there are many asynchronous short-circuited rotor generators, such as the so-called squirrel cage rotor, coupled to turbines, such as wind turbines, and connected directly to a three-phase electric power distribution grid by voltage step-up transformers. Consequently, said configuration of turbine connected to a generator is used to produce electric power that reaches end users through the three-phase electric power distribution grid.

Asynchronous short-circuited rotor generators, i.e., squirrel cage, are widely used because they are simple, robust, and relatively inexpensive. However, such squirrel cage generators also have disadvantages, such as high current demand during startup requiring a soft start function, a minimal ability to vary the rotational speed of the turbine because of a stiff characteristic torque versus rotational speed in the stable operation region, with resulting significant oscillations of the electromagnetic torque and of the active power transmitted to the electrical system, the inability to meet a requirement for dynamic reactive power exchange from the distribution grid for proper operation, the inability of starting up and operating as a stand-alone system, the inability to be insulated from the external power oscillations from the distribution grid, and the inability to damp such power oscillations.

It would be highly desirable to have a squirrel-cage generator which retained the features of simplicity, robustness. and relative low cost without the disadvantages discussed above.

BRIEF SUMMARY OF THE INVENTION

The present invention resolves or reduces one or more of the disadvantages explained above by providing a short-circuited rotor generator in which the stator of the generator is connected in series with the electric power distribution grid through a first winding of a transformer. Preferably, the generator is connectable to a turbine, such as a wind turbine. Those skilled in the art will also recognize that the principles of the invention also apply to a squirrel cage motor.

An object of the invention is to connect the stator of a squirrel cage generator or motor in series with an electric power distribution grid through a first winding of a transformer. Preferably, the voltage applied to a second winding of the transformer is controlled through a transformer side electric power converter; consequently, the voltage level of the generator's stator is controlled.

Preferably, the stator of the generator or motor is also connected to the same distribution grid through a stator side electric power converter connected by a direct current link to the transformer side electric power converter.

The above-described dual connection makes it possible to increase the overall performance of the electric generator or motor by reducing the losses in the iron of the generator.

A further object of the invention is to provide a short-circuited rotor generator or motor with many different modes of operation allowing it to continue to operate when one or more of the converters fail.

Another object of the invention is to allow a smooth connection of the generator or motor to the electric power distribution grid, increasing the quality of the electrical production during this period.

Another object of the invention is to permit the short-circuited rotor machine to continue the supply of electric power or operate as a motor when voltage variations occur on the electric power distribution grid, both in balanced as well as unbalanced operating conditions of the generator. A further object of the invention is to contribute to the stability of the distribution grid by providing reactive power to the grid.

Yet another object of the invention is that the generator or motor be capable of dynamically swapping reactive power with the distribution grid, regardless of the amount of load on the generator.

Another object of the invention is that the generator be capable of generating a voltage of nominal value at its output when the electric power distribution grid is not available.

Still another object of the invention is that the generator coupled to a wind generator is capable of being connected to the electric distribution grid when wind speed is low. Consequently, sites with low wind resources can be used with the short-circuited rotor generator according to the invention.

Yet another object of the invention is to be able to operate with at least a small amount of speed variation to permit the recovery of the torque oscillations reducing stresses and loads and increasing the mechanical performance.

Another object of the invention is to retain ruggedness and reliability of asynchronous short-circuited rotor generators and motors as well as a large capacity for transitory overloads.

Another object of the invention is to provide an apparatus and method that can effectively retrofit already installed short-circuited rotor generators or motors to make them compliant with new regulations.

Numerous other features, objects, and advantages of the invention will become apparent from the following description when read in conjunction with the accompanying drawings.

BRIEF DESCRIPTION OF THE DRAWINGS

A more detailed explanation of the invention is given in the following description, based on the attached figures in which.

DETAILED DESCRIPTION OF TEE INVENTION

Figure 1:
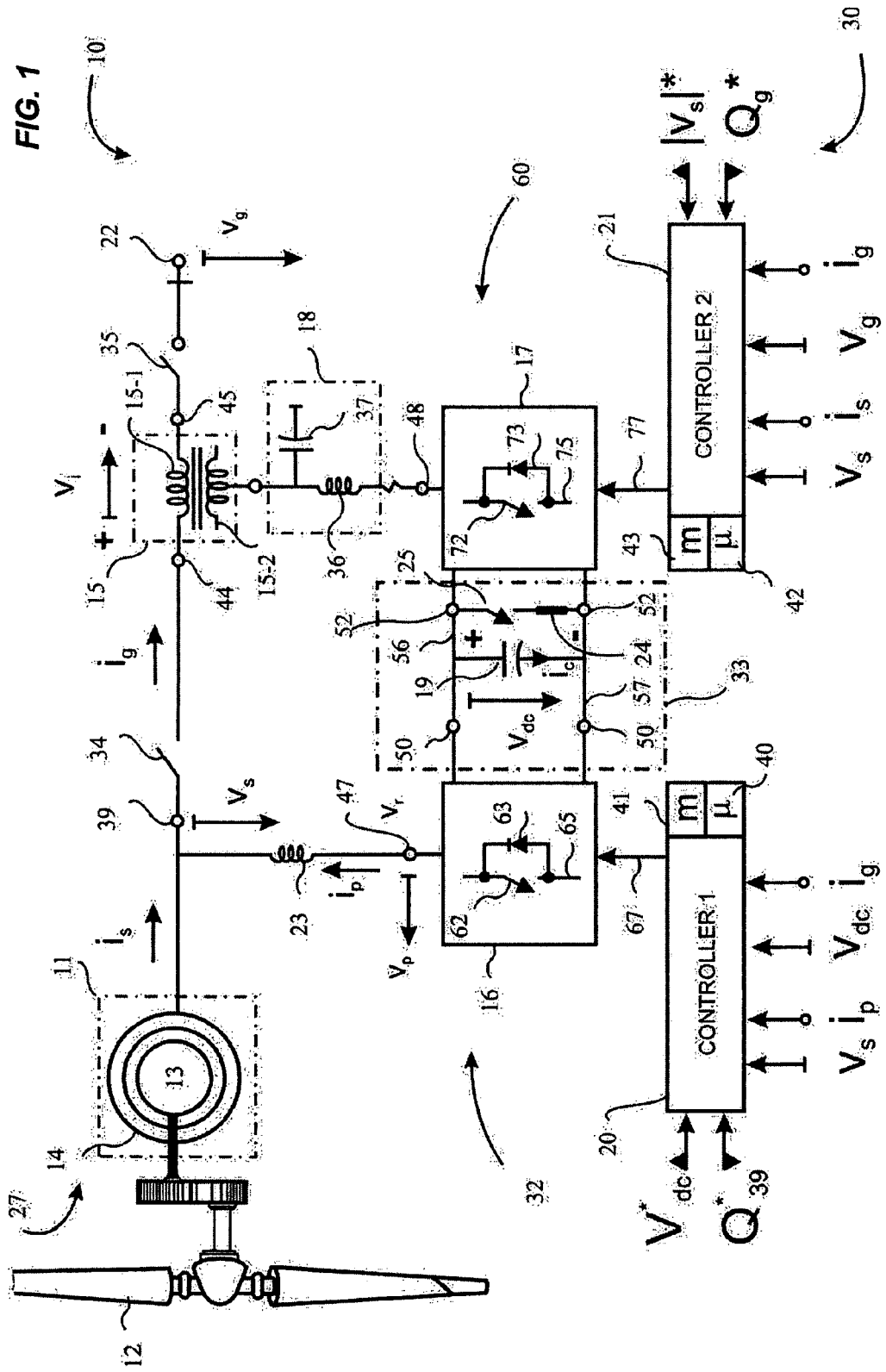
FIG. 1 shows a block diagram of a wind generator according to the invention.

FIG. 1 is a block diagram illustrating a preferred embodiment of a generator or motor system 27 according to the invention. In this embodiment, the generator system 27 is incorporated into a wind turbine generator 10, which includes a turbine 12 and generator system 27. Generator system 27 includes a generator 11, often referred to as an induction generator, and a controller 30. Generator 11 includes a rotor 13 and a stator 14. System 10 preferably is a wind turbine system, and generator 11 preferably is a shorted-rotor generator 11. Turbine 12 is connectable to generator 11 in such a way that the turbine is coupled to the rotor 13 that turns inside stator 14 of the generator 11. Power produced by system 10 is fed to a power grid 22. As will be seen in detail below, the generator system 27 according to the invention controls the voltage $V_s$ applied to the stator by injecting a voltage $V_t$ into the stator/grid connection via transformer 15 using a novel control system. This and other features of the invention described below results in a generator or motor system that is much more flexible than prior art systems.

Generator controller 30 includes transformer 15, a first electric power converter 16, a second electrical power converter 17, a direct current link 33, a filter 18, a first controller module 20, a second controller module 21, a generator/transformer switch 34, a transformer/grid switch 35, a stator/converter switch 31, and an inductance 23. Transformer 15 includes a first winding 15-1 and a second winding 15-2. Direct current link 33 includes a capacitor 19, a resistor 24, and a switch 25. Filter 18 includes an inductor 36 and a capacitor 37. First controller module 20 includes a microprocessor 40 and memory 41, and second controller module 21 includes a microprocessor 42 and memory 43.

Stator 14 is connected in series to a first end 44 of first winding 15-1 of transformer 15, and electric power distribution grid 22 is connected to the second end 45 of the first winding 15-1 of the transformer 15.

Stator 14 is connected to an input 47 of a first electric power converter 16, the output 50 of which is connected in cascade, using a direct current connection, to an input 52 of second electric power converter 17, which has an output 48 connected to second winding 15-2 of the transformer 15 through filter 18.

Capacitor 19 is connected across direct current link nodes 56 and 57. Capacitor 19 stores electric energy in accordance with the active power swapped between first converter 16 and second converter 17.

Furthermore, resistance 24 is connected through switch 25 across direct current link nodes 56 and 57. Resistor 24 and switch 25 are used to ensure that the maximum voltage levels of the direct current link are not exceeded in the different modes of operation.

First electric power converter 16 transforms an essentially fixed frequency alternating current deviated from the stator/grid electrical path 32 into direct current; subsequently, the second converter 17 transforms the direct current from the DC link to alternating current at the frequency of the grid. In this way, a portion of the total power delivered by the generator 11 is transferred between the generator's stator and the distribution grid 22.

In another mode of operation of generator 11, the distribution grid 22 can supply electric power to the generator stator via electrical path 32 and also through the second power converter 17 and first electric power converter 16. That is, electric power can flow bi-directionally through the connections 32, 60 between the stator and the distribution grid 22. Thus, it is evident to those skilled in the art that the system of the invention is applicable not only to a generator, but is also applicable to a motor.

The total electric power output from the generator 11 is obtained at the grid 22 by adding the partial electric power transfers via the path 32 and 60, i.e., power converter 16, DC link and power converter 17, to the rest of electric power generated by the generator 11, i.e., power injected at the point 44 via transformer 15.

The first converter 16 includes a set of switching elements, symbolized by switch 62 and diode 63, each of which has a control terminal 65 through which an on and/or off signal is applied.

Figure 2:
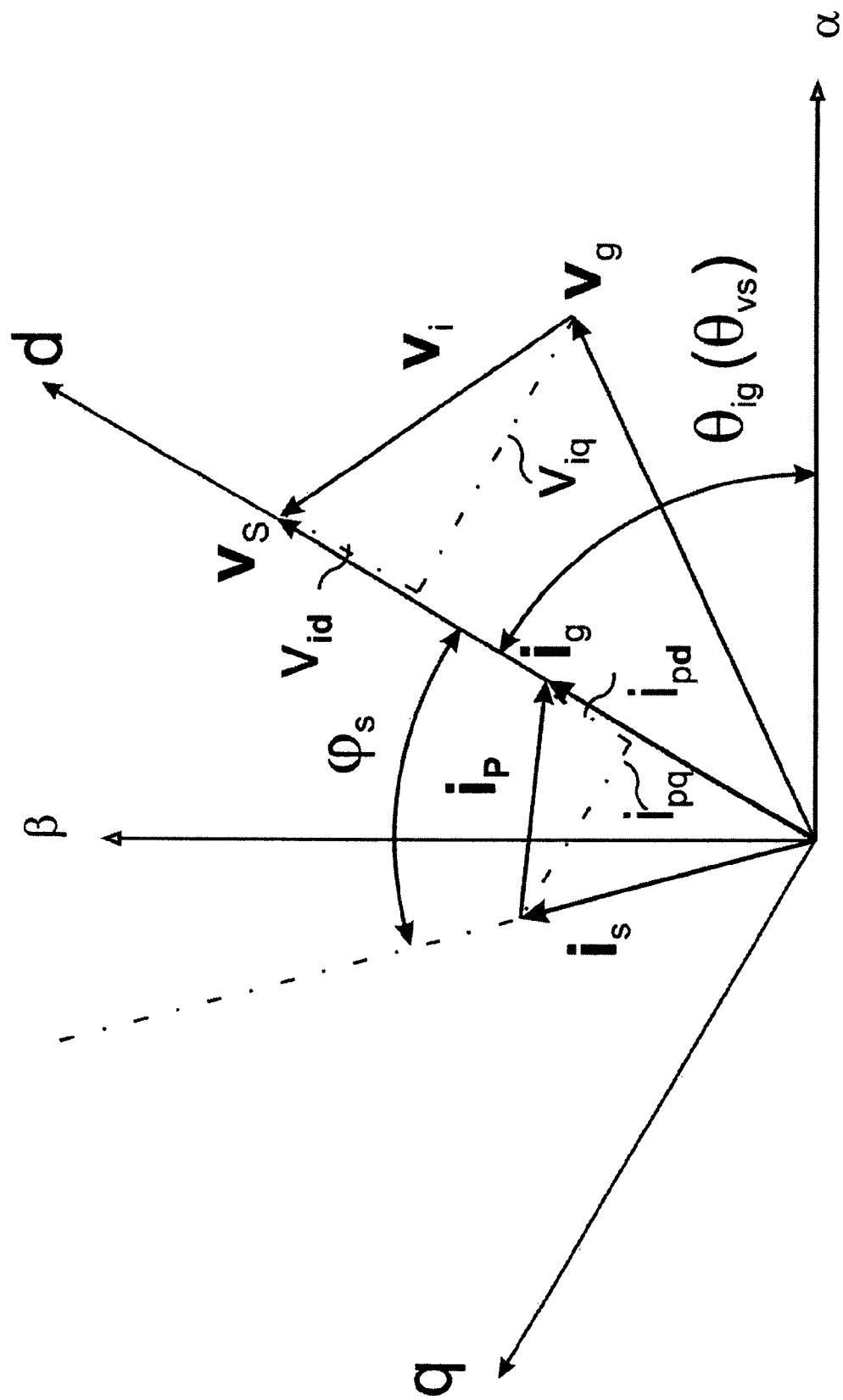
FIG. 2 shows a vector diagram illustrating the various vectors, vector components, and angles relevant to the invention and showing how the stator voltage may be controlled while injecting a desired reactive power.

With reference now to FIGS. 1 and 2, first controller module 20 generates and supplies the switching signals to first converter 16 via line 67, and to achieve this, the first controller 20 calculates and/or receives a signal $V_{dc}$ proportional to the voltage in the DC link 33, a signal $i_p$ proportional to the current at node 47, a signal $i_g$ proportional to the current output, and a signal $V_s$ proportional to the voltage at the stator. A DC link voltage reference signal $V^*_{dc}$ and a reactive power reference signal $Q^*_{39}$ are also applied to controller 20. These reference signals provide the set points for the DC link voltage and the reactive power at node 39, respectively. As is known in the art, the DC link voltage $V_{dc}$ is determined by external parameters. For example, in the example of the wind turbine, it is determined by the grid voltage. In the preferred embodiment, the desired value of $Q^*_{39}$ is zero so as to minimize the current at node 39. The manner in which the system according to the invention uses the set points to control $V_{dc}$ and $Q_{39}$ will be described below.

The first controller 20 includes a memory 41 that stores a control algorithm utilized by microprocessor 40, which algorithm maybe a vector control algorithm, a direct power control algorithm, or any other suitable control algorithm, with which the voltage of the DC link, $V_{dc}$, is regulated to permit instantaneous transfer of active power through electrical path 60, and the reactive power at node 39, $Q_{39}$, is regulated to guarantee that $V_s$ and $i_g$ are aligned which naturally decouples the effects of $V_{id}$ and $V_{iq}$. That is, $V_{id}$ affects only the value of $|V_s|$, and $V_{iq}$ affects only the value of $Q_g$, the total reactive power applied to the grid.

Similarly, second converter 17 includes a set of switching elements, symbolized by switch 72 and diode 73, each of which has a control terminal 75 through which an on and/or off signal is applied.

Second controller module 21 generates and supplies the on or off signals to second converter 17 via line 77. To achieve this, second controller 21 calculates and/or receives a signal $V_s$ proportional to the voltage of the stator 14, a signal $i_s$ proportional to the current of the stator 14, a signal $V_g$ proportional to the distribution grid 22 voltage, and a signal $i_g$ proportional to generator current applied grid at output 22. An absolute value, also referred to as the modulus, of the stator voltage reference signal $|V^*_s|$ and a total reactive power reference signal $Q^*_g$ also are applied to grid side inverter controller 21. These reference signals provide the set points for the absolute value of the stator voltage $|V_s|$ and the total reactive power $Q_g$. As is known in the art, the set point $|V*_s|$ is determined by a higher level control loop as known in the art. The set point $Q*_g$ is a reactive power value desired to be output as determined by the operating conditions of the grid.

Second controller 21 stores an algorithm in memory 43 utilized by microprocessor 42 to regulate the total reactive power $Q_g$ following a control strategy that utilizes reference value $Q*_g$. Memory 43 of second controller 21 also stores an algorithm utilized by microprocessor 42 to regulate the modulus of the voltage resulting from or applied to the generator's stator 14, following a control strategy that utilizes reference value $|V*_s|$. These algorithms may be a vector control algorithm, such as a voltage oriented control algorithm, a direct power control algorithm, or any other suitable control algorithm Consequently, first controller 20 and second controller 21 govern the first 16 and second 17 converters, respectively, in such a way that they directly control the absolute voltage applied to the generator's stator 14 and the total reactive power applied to the grid, therefore making the system according to the invention much more stable under grid variations and better able to strengthen the grid as required by grid code requirements.

Tuning to FIG. 2, there is shown a vector diagram illustrating the various vectors, vector components, and angles relevant to the invention and showing how the stator voltage maybe controlled while injecting a desired reactive power. In this example, for ease of understanding, the stator voltage $V_s$ and the grid current $i_g$ are aligned, which is the preferred operating condition of the system. The vectors, vector components, and angles are illustrated in a stationary coordinate system along the directions α and β. The coordinate system d and q is a synchronous coordinate system with d in the direction of the stator voltage $V_s$ and the grid current $i_g$, and q in a direction orthogonal to the direction the stator voltage $V_s$ and the grid current $i_g$.

In FIG. 2, $V_s$ is the stator voltage, $V_g$ is the grid voltage, and $V_i$ is the voltage injected via transformer 15. Also, $i_s$ is the stator current, $i_g$ is the grid current, and $i_p$ is the current flowing at node 47. $\theta_{ig}$ is the angle between α and the grid current $i_g$, which angle, in this operating mode, is the same as $\theta_{vs}$, the angle between α, and the stator voltage $V_s$. $V_{id}$ is the component of $V_i$ in the direction of the grid current and the stator voltage, and $V_{iq}$ is the component of $V_i$ in the direction orthogonal to the grid current and the stator voltage, while $i_{pd}$ is the component of $i_p$ in the direction of the grid current and stator voltage, and $i_{pq}$ is the component of $i_p$ in the direction of the grid current and stator voltage. As will be shown below, controller 20 determines the reference values of $i*_{pd}$ and $i*_{pq}$ to force the system to the set points $V*_{dc}$ and $Q*_{39}$, and controller 21 determines the values of $V_{id}$ and $V_{iq}$ to force the system to the set points $|V*_s|$ and $Q*_g$.

Figure 3:
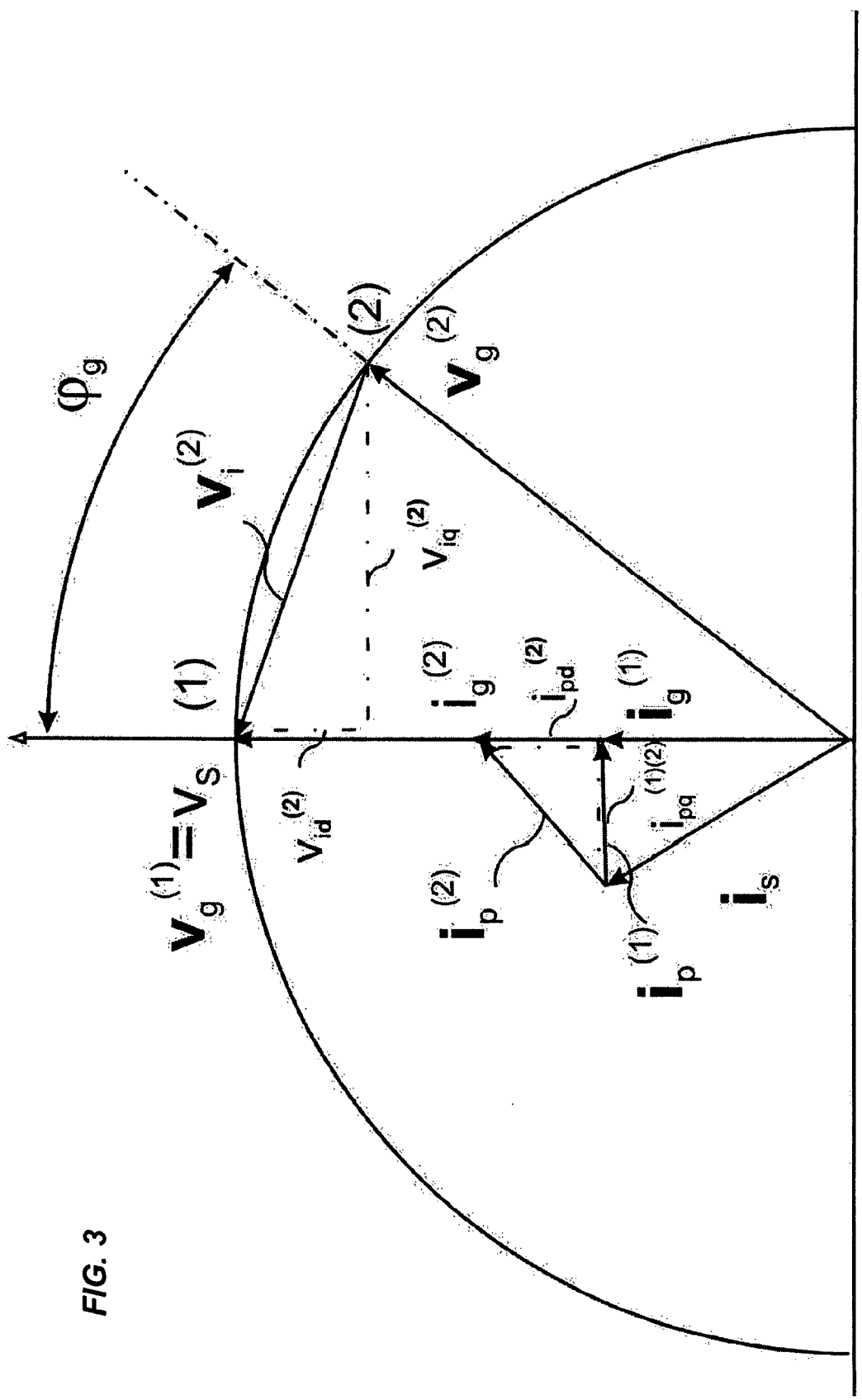
FIG. 3 is a vector diagram illustrating how the reactive power can be dynamically varied for two different working points of the generator according to the invention.

FIG. 3 is a vector diagram illustrating how the reactive power can be dynamically varied for two different working points of the generator according to the invention. Since the purpose of this figure is to illustrate how the reactive power is adjusted, the absolute value of the stator voltage $V_s$ and the grid voltage $V_g$ are assumed to be the same so as not to unduly complicate the figure. However, those skilled in the art will recognize that all of these variables can change simultaneously. At working point (1), the power factor is unity and $V_g^{(1)} = V_s$. For a shorted-rotor induction machine, the stator current $i_s$ must be leading in relation to the stator voltage $V_s$. The requirement that the active power at node 47, i.e., $P_p = V_s$, $i_{pd}$ must be the same as the active power at node 48, i.e., $P_i = V_{id}$, $i_g$ requires that $i_{pd}$ is zero because $V_{id}$ is zero. At working point (2), it is decided to apply a reactive power at the node 22 which is indicated by the fact that the grid voltage $V_g$ is now out of phase with the grid current $i_g$ by an angle $\phi_g$. The generator is set to this reactive power by applying the shown $V_{iq}^{(2)}$. To keep $|V_s|$ constant, the system adjusts $V_{id}$ to $V_{id}^{(2)}$ as shown. The additional reactive power added to the generator output causes $i_g$ to increase to $i_g^{(2)}$ as shown. This requires controller 20 to add an $i_{pd}^{(2)}$ and an $i_{pq}^{(2)}$ as shown to hold $V_{dc}$ to $V_{dc}*$ and $Q_{39}$ to $Q*_{39}$.

Figure 4:
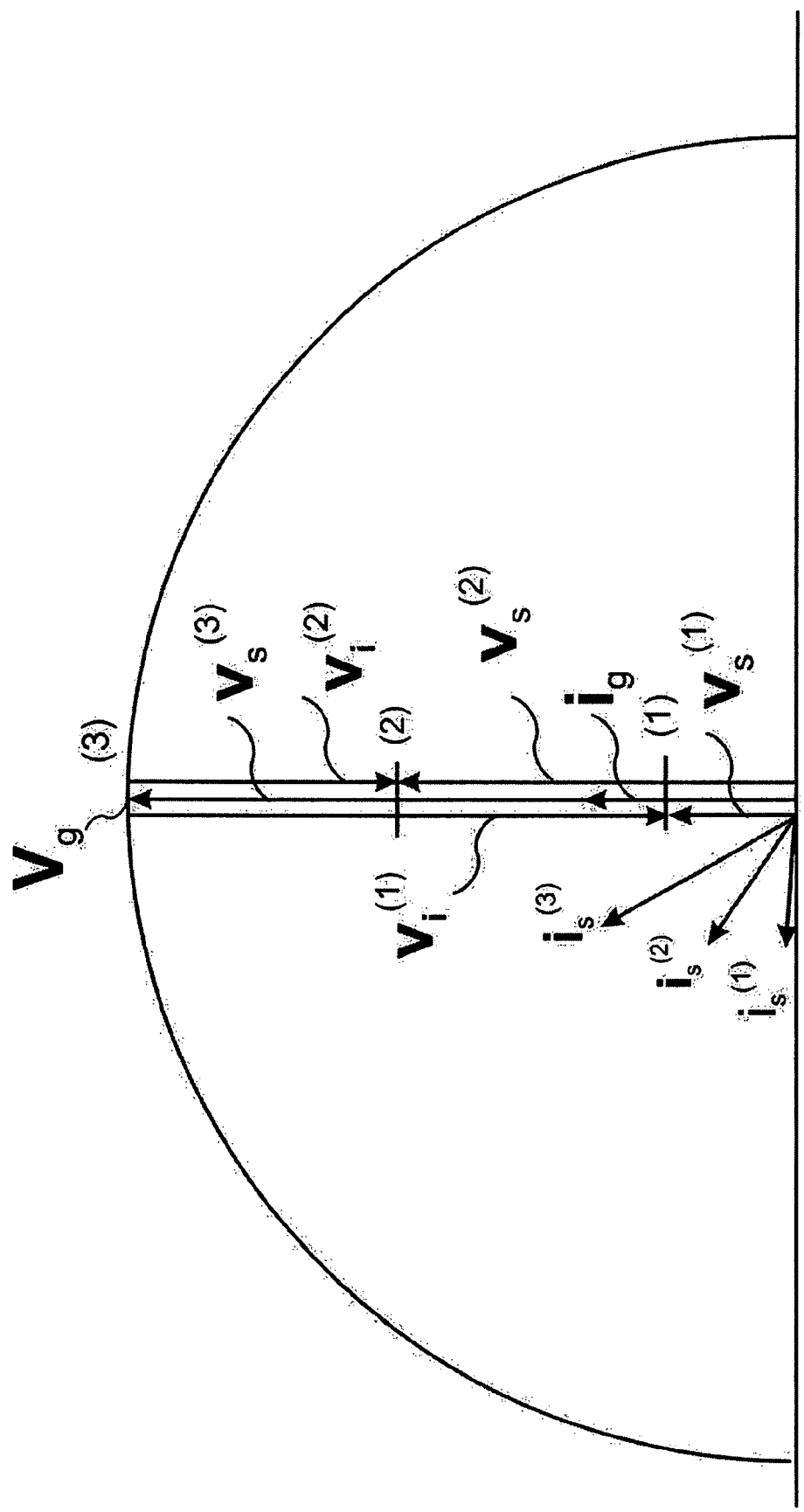
FIG. 4 is a vector diagram illustrating the soft start function of a generator or motor according to the invention.

FIG. 4 is a vector diagram illustrating the soft start function of a generator or motor according to the invention. Three working points of the start process are shown. For all three working points, $V_g$ is the same. At the first working point (1), the stator voltage $V_s$ is made very small by inserting a $V_i$ (not shown so as not to complicate the figure) equal to $V_i^{(1)} = V_s^{(1)} - V_g$ via transformer 15. Due to the required lag between the stator current and stator voltage, $i_s^{(1)}$ is nearly 90 degrees leading to the stator voltage indicating the system is absorbing significant reactive power. At the second working point (2), $V_s^{(2)}$ has a smaller negative value to yield a larger $V_s^{(2)}$ and an $i_s^{(2)}$ that is leading less, resulting in a small reactive power being absorbed. At the third working point (3), $V_s^{(3)}$ is zero to yield $V_s^{(3)} = V_g$ resulting in $i_s^{(3)}$ lagging only by the nominal amount required by the short-circuited rotor inductive system.

Figure 5:
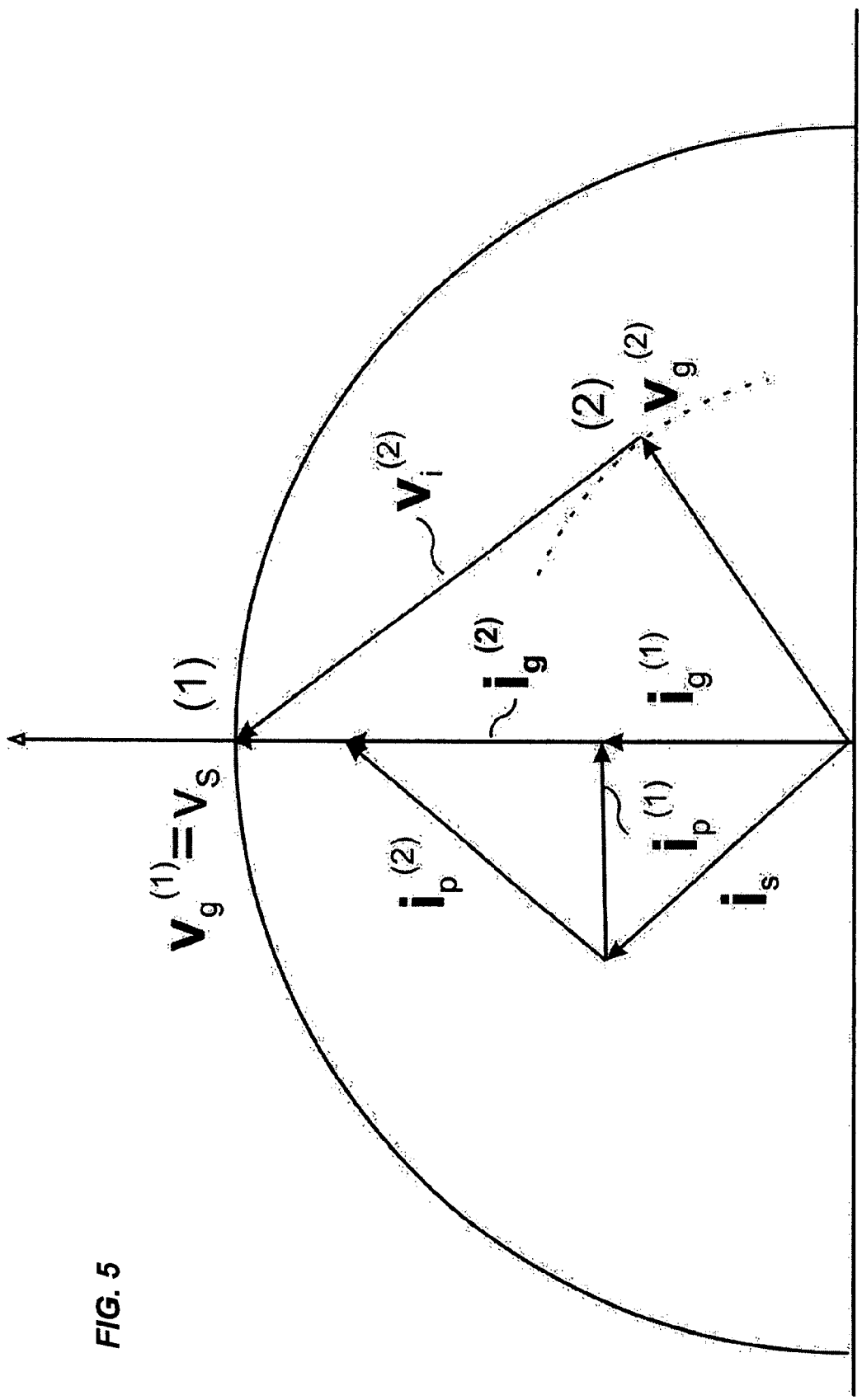
FIG. 5 is a vector diagram illustrating how the generator according to the invention applies the predetermined value of $|V_s|$ corresponding to $|V^*_s|$ to the stator during voltage dips of the grid voltage.

FIG. 5 is a vector diagram illustrating how the generator according to the invention applies the predetermined value of $|V_s|$ corresponding to $|V*_s|$ to the stator during voltage dips of the grid voltage. For simplicity in this figure, $V_g$ is in the same direction as $i_g$. Two working points (1) and (2) are shown. At the first working point (1), $V_g^{(1)} = V_s$, which is equal to the set point value of the stator voltage, and $i_s$ has the required lead determined by the machine parameters. Controller 20 applies an appropriate $i_p^{(1)}$ due to the fact that the grid current and grid voltage are aligned. At working point (2), the grid voltage $V_g$ suddenly drops. To keep the stator voltage at the set point, the system applies, via controller 21 and converter 17, a $V_i^{(2)}$ as shown via the transformer 15. This causes $i_g^{(2)}$ to rise, which requires controller 20 to apply a larger $i_p^{(2)}$ as shown to keep the grid current and grid voltage aligned.

Figure 6:
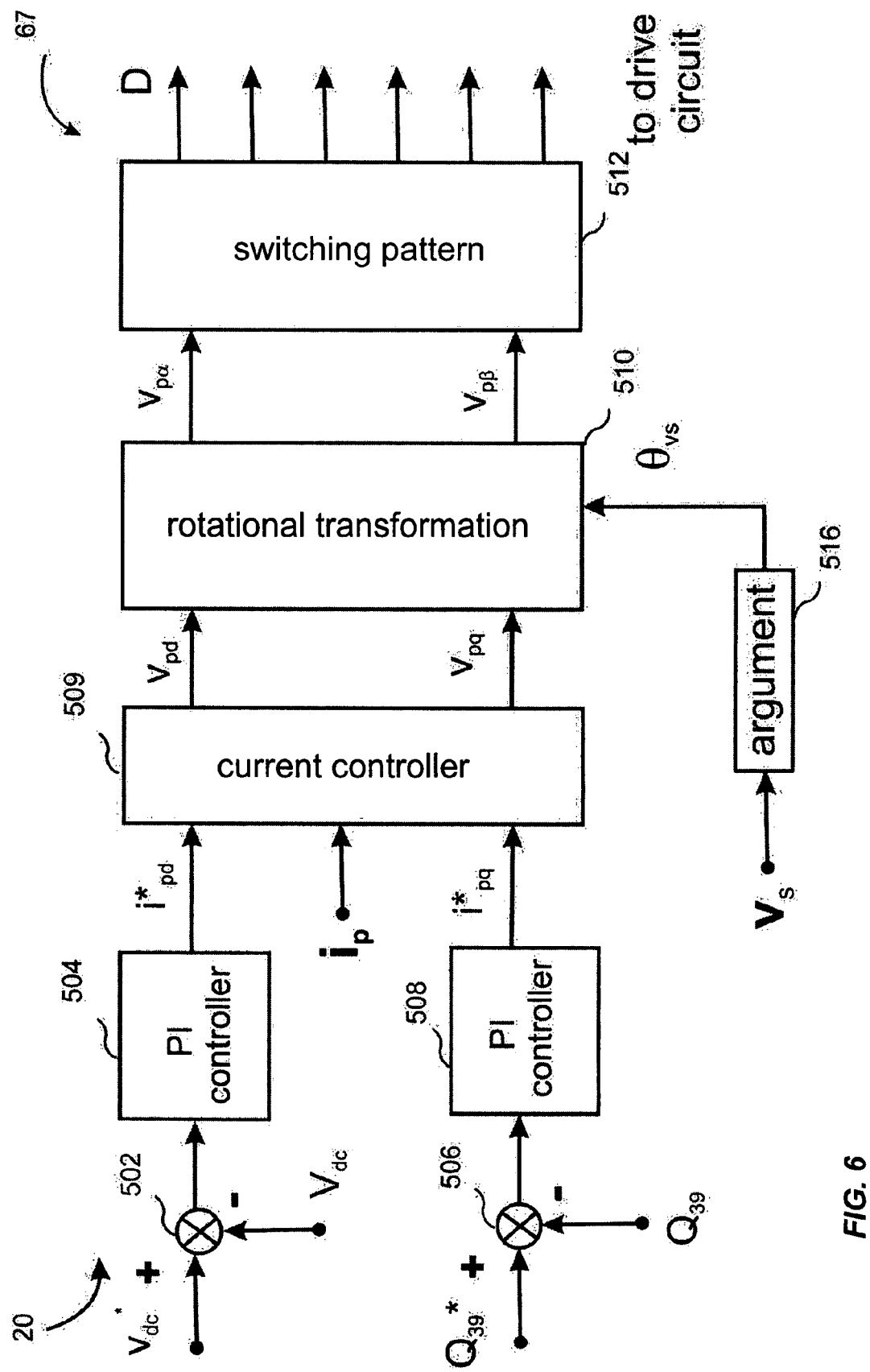
FIG. 6 is a block diagram illustrating a preferred embodiment of controller for the grid side inverter.

FIG. 6 is a block diagram illustrating a preferred embodiment of controller for the stator side inverter 20. This example assumes a control algorithm using voltage vector oriented vector control, though other control systems and algorithms may be used. Stator side controller 20 comprises comparators 502 and 506, PI controllers 504 and 508, rotational transformation 510, switching pattern generator 512, which preferably is a pulse width modulator, and argument calculator 516. The $V_{dc}*$ reference signal and the measured $V_{dc}$ signal are input into comparator 502, which outputs a signal representative of their difference to PI controller 504. The $Q_{39}*$ reference signal and measured $Q_{39}$ signal are input into comparator 506 which outputs a signal representative of their difference to PI controller 508. PI controller 504 is designed to guarantee that the set point $V_{dc}*$ is reached with the specific dynamics of the generator 27 and outputs the required value reference of $i*_{pd}$ to reach this set point. PI controller 508 is designed to guarantee that the set point $Q_{39}*$ is reached with the specific dynamics of the generator 27 and outputs the required value reference of $i*_{pq}$ to reach this set point. Current controller 509 provides an inner control loop that compares the measured value $i_p$ to $i*_{pd}$ and $i*_{pq}$ and outputs $V_{pd}$ and $V_{pq}$ to the rotational transformation 510. Argument calculator 516 calculates the angle of $V_s$ and outputs this angle $\theta_{vs}$ to the rotational transformer 510. Using the angle, rotational transformer 510 rotates the coordinates of $V_{pd}$ and $V_{pq}$ from the synchronous coordinates to the stationary coordinates α and β. The resulting current components $Vi_{p\alpha}$ and $V_{p\beta}$ are applied to switching pattern generator 512 which applies an appropriate duty cycle generator, such as pulse width modulation, to the voltages to determine the drive signals 67 to be applied to the converter 16.

Figure 7:
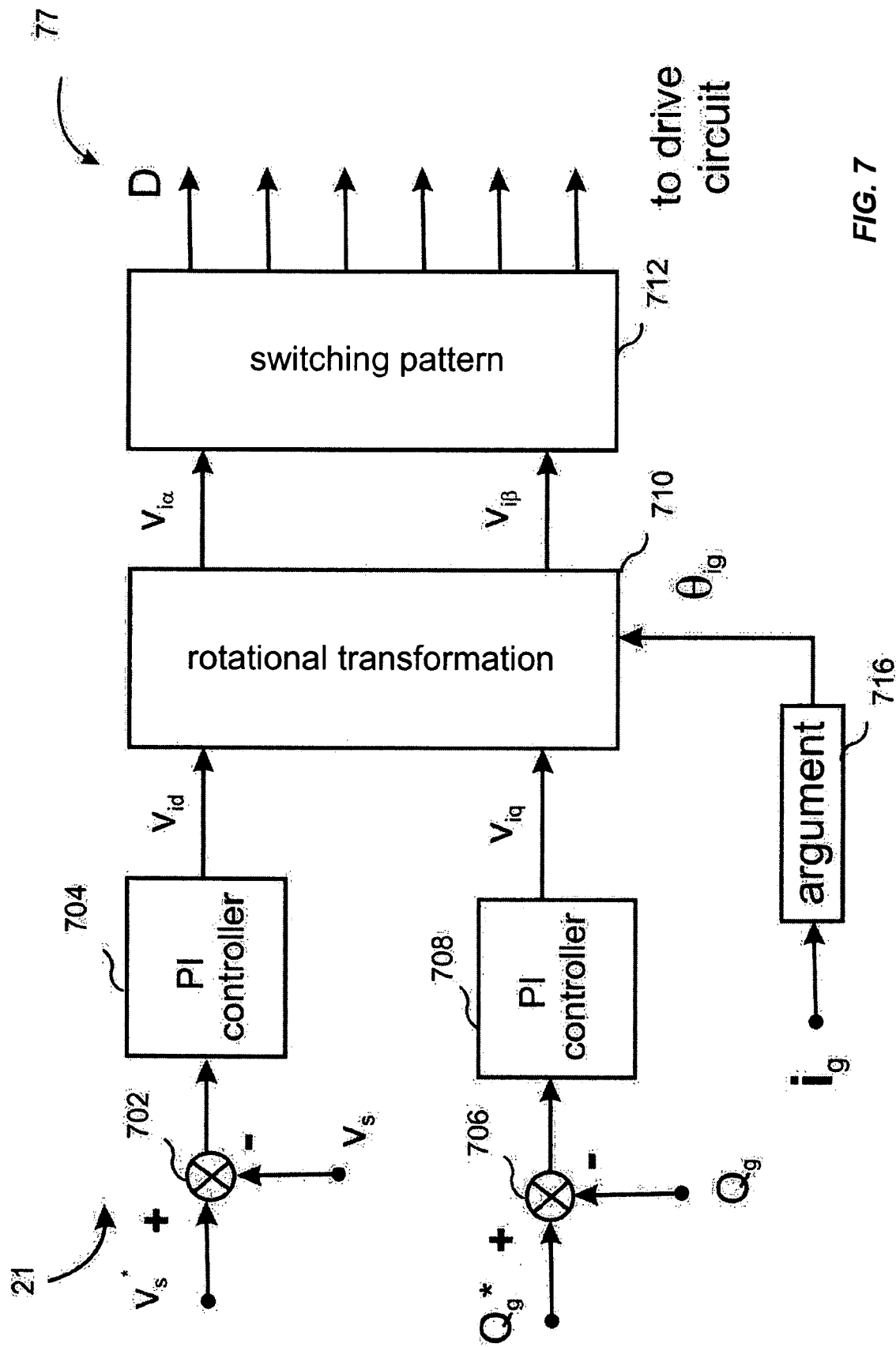
FIG. 7 is a block diagram illustrating a preferred embodiment of controller for the stator side inverter.

FIG. 7 is a block diagram illustrating a preferred embodiment of controller for the grid side inverter. This example assumes a control algorithm using current oriented vector control, though other control systems and algorithms maybe used. Grid side controller 21 comprises comparators 702 and 706, PI controllers 704 and 708, rotational transformation 710, switching pattern generator 712, which preferably is a pulse width modulator, and argument calculator 716. The $V_s^*$ reference signal and the measured $V_s$ signal are input into comparator 702, which outputs a signal representative of their difference to PI controller 704. The $Q_g^*$ reference signal and measured $Q_g$ signal are input into comparator 706, which outputs a signal representative of their difference to PI controller 708. PI controller 704 is designed to guarantee that the set point $V_s^*$ is reached with the specific dynamics of the generator 27 and outputs the required value of $V_{id}$ to reach this set point. PI controller 708 is designed to guarantee that the set point $Q_g^*$ is reached with the specific dynamics of the generator 27 and outputs the required value of $V_{iq}$ to reach this set point. Argument calculator 716 calculates the angle of $i_g$ and outputs this angle $\theta_{ig}$ to the rotational transformer 710. Using the angle $\theta_{ig}$, rotational transformer 710 rotates the coordinates of $V_{id}$ and $V_{iq}$ from the synchronous coordinates to the stationary coordinates $\alpha$ and $\beta$. The resulting voltages $V_{i\alpha}$ and $V_{i\beta}$ are applied to switching pattern generator 712, which applies an appropriate duty cycle generator, such as pulse width modulation, to the voltages to determine the drive signals 77 to be applied to the converter 17.

It should be observed that both the first and second controllers 20,21 can work in coordinated mode or either of them can work with the other one disconnected, or even neither of the two activated, the generating capacities being reduced in each case.

The way the voltage resulting from and/or applied to the stator 14 is governed based on controlling the voltage delivered in series from the second converter 17 to the electric distribution grid 22 through the transformer 15. The voltage $V_i$ of the second converter 17 is vectorally added to the voltage $V_g$ of the distribution grid 22.

Moreover, it should be observed that the present invention can be implemented in a variety of computers that include microprocessors, a computer-readable storage means that includes volatile and non-volatile memory elements, and/or storage elements. The logic of the computer hardware that cooperates with various sets of instructions is applied to the data in order to carry out the previously described functions and to generate output information. The programs used for the computer hardware, byway of example, preferably can be implemented in various programming languages, including a high-level-process- or object-oriented programming language for communicating with a computer system. Each computer program preferably is stored in a storage means or device (e.g., ROM or magnetic disc) that can be read by a general use or special use programmable computer for configuring and operating the computer when the storage means or device is read by the computer in order to execute the procedures described above. Moreover, the first and second controller can be considered as being implemented as a computer-readable storage medium, configured with a computer program, where the storage medium thus configured makes the computer operate in a specific, predefined way.

The two microprocessors of the first and second controller can be in communication or encapsulated in a single component.

There has been described a novel short-circuited rotor (squirrel cage) generator or motor. Now that the apparatus and processes of the invention have been described, those skilled in the art may make many variations. It should be understood that the particular embodiments shown in the drawings and described within this specification are for purposes of example and should not be construed to limit the invention, which will be described in the claims below. The description, as it has been explained, is not intended to be exhaustive of the invention or to limit the invention to the specific form described. Many modifications and variations are possible in light of the foregoing examples, without going beyond the spirit and scope of the following claims. For example, many different controllers other than PI controllers may be used. It is also evident that those skilled in the art may now make numerous uses and modifications of the specific embodiments described, without departing from the inventive concepts. It is further evident that the methods recited may, in many instances, be performed in a different order, or equivalent components maybe used and/or equivalent processes maybe substituted for the various processes described. Consequently, the invention is to be construed as embracing each and every novel feature and novel combination of features present in and/or possessed by the invention herein described.

What is claimed as new and desired to be protected by Letters Patent of the United States is:

1. An electric power generator system or motor comprising:
    a short-circuited rotor induction generator or motor comprising a stator and a rotor;
    a transformer having a first winding and a second winding, said first winding having a first end and a second end;
    a first electric power converter having an input and an output; and
    a second electric power converter having an input and an output;
    wherein;
    said stator is connected to said input of said first electric power converter, said output of said first electric power converter is connected to said second electric power converter via a direct current connection, and said output of said second electric power converter is connected to said second winding of said transformer; and
    said stator and said transformer are connectable in series with an electric power distribution grid.

2. An electric power generator system or motor according to claim 1, and further comprising a filter wherein said output of said second electric power converter is connected to said second winding of said transformer through said filter.

3. An electric power generator system or motor according to claim 1, further comprising a capacitor wherein said direct current connection includes a first node and a second node, and said capacitor is connected between said first node and said second node.

4. An electric power generator system or motor according to claim 1 wherein said system includes a first controller producing on/off control signals, said first converter includes a plurality of first converter switching elements, each of which has an input terminal, and said first controller on/off control signals are applied to said first converter switching element input terminals.

5. An electric power generator system or motor according to claim 4 wherein said first controller regulates with said on/off signals one of the current between said first converter and said stator, and the sum of the reactive power of said stator and the reactive power of said converter.

6. An electric power generator system as in claim 5 wherein said first converter regulates said sum to be zero.

7. An electric power generator system or motor according to claim 1 wherein said system includes a second controller producing on/off control signals, said second converter includes a plurality of second converter switching elements, each of which has an input terminal, and said on/off control signals are applied to said second converter switching element input terminals.

8. An electric power generator system or motor according to claim 7 wherein said second controller regulates one of the stator voltage and the total reactive power applied to said grid with said on/off signals.

9. An electric power generator system comprising:
   a short-circuited rotor induction generator comprising a stator and a rotor; and
   a transformer having a first winding and a second winding, said first winding having a first end and a second end;
   wherein said stator and said transformer are connectable in series with an electric power distribution grid and said generator is connected to a turbine.

10. An electric power generator system according to claim 9 wherein said turbine is a wind turbine.

11. A method of generating electrical power, said method comprising:
    generating electrical power using a short-circuited rotor induction generator comprising a stator and a rotor;
    connecting a first winding of a transformer in series between said stator and an electric power distribution grid;
    flowing power between said stator and said electric power distribution grid via said transformer;
    connecting a first converter, a direct current link, and a second converter in series between said stator and a second winding of said transformer; and
    regulating one of the current between said first converter and said stator, and the sum of the reactive power of said stator and the reactive power of said converter.

12. A method according to claim 11, and further comprising regulating one of the stator voltage and the total reactive power applied to said grid with said second converter.

13. A method of generating electrical power, said method comprising:
    generating electrical power using a short-circuited rotor induction generator comprising a stator and a rotor;
    connecting a first winding of a transformer in series between said stator and an electric power distribution grid; and
    flowing power between said stator and said electric power distribution grid via said transformer, said flowing comprising flowing said power through a second winding of said transformer.

14. A method according to claim 13 wherein said flowing power between said stator and said grid further comprises flowing said power through a direct current bus between a first converter and a second converter located between said transformer and said stator.

15. A method according to claim 14 wherein said DC bus includes a first node and a second node, and wherein a capacitor is connected between said first node and said second node, and said method further comprises regulating the voltage applied to said capacitor based on a predetermined reference value ($V^*_{dc}$) so that power is dynamically transferred from said stator to said distribution grid.

16. A method according to claim 15, and further comprising flowing power bidirectionally between the said first converter and said second converter.

* * * * *